US012033091B2

United States Patent
Allen et al.

(10) Patent No.: US 12,033,091 B2
(45) Date of Patent: Jul. 9, 2024

(54) MATCHING DRIVERS WITH SHARED VEHICLES TO OPTIMIZE SHARED VEHICLE SERVICES

(71) Applicant: Allstate Insurance Company, Northbrook, IL (US)

(72) Inventors: Rachel Edelshteyn Allen, Chicago, IL (US); Benjamin Labaschin, Chicago, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

(21) Appl. No.: 16/411,383

(22) Filed: May 14, 2019

(65) Prior Publication Data

US 2019/0347582 A1    Nov. 14, 2019

Related U.S. Application Data

(60) Provisional application No. 62/671,157, filed on May 14, 2018.

(51) Int. Cl.
| | |
|---|---|
| G06Q 10/02 | (2012.01) |
| B60W 40/09 | (2012.01) |
| G06Q 30/08 | (2012.01) |
| G06Q 50/40 | (2024.01) |

(52) U.S. Cl.
CPC .............. *G06Q 10/02* (2013.01); *B60W 40/09* (2013.01); *G06Q 30/08* (2013.01); *G06Q 50/40* (2024.01)

(58) Field of Classification Search
CPC ........ G06Q 10/02; G06Q 30/08; G06Q 50/30; B60W 40/09
See application file for complete search history.

(56) References Cited

U.S. PATENT DOCUMENTS

| | | | | |
|---|---|---|---|---|
| 2012/0330696 | A1* | 12/2012 | Clark ..................... | G08G 1/205 705/5 |
| 2014/0089208 | A1* | 3/2014 | Humble ................. | G06Q 10/20 705/305 |
| 2014/0322676 | A1* | 10/2014 | Raman ................. | G09B 19/167 434/65 |
| 2015/0100505 | A1* | 4/2015 | Binion ................... | G07C 5/008 705/306 |

(Continued)

OTHER PUBLICATIONS

Enev et al., Automobile Driver Fingerprinting, 2016, Retrieved from <http://www.autosec.org/pubs/fingerprint.pdf>, Retrieved on Feb. 9, 2024. (Year: 2016).*

(Continued)

*Primary Examiner* — Michael P Harrington
*Assistant Examiner* — Tayar M Kyu
(74) *Attorney, Agent, or Firm* — Akerman LLP

(57) ABSTRACT

A system may receive information indicating a driver requesting a shared vehicle, estimate, based on web browsing information associated with the driver, one or more characteristics of the driver, determine, based on the characteristics of the driver, a driver safety score indicating an estimated risk of an accident involving the driver, select, from a plurality of available vehicles, a subset of the plurality of available vehicles based on the driver safety score, and cause the display of a user interface offering the subset of the plurality of available vehicles to the driver.

18 Claims, 10 Drawing Sheets

(56) References Cited

U.S. PATENT DOCUMENTS

| | | | | |
|---|---|---|---|---|
| 2015/0371153 | A1* | 12/2015 | Lohmeier | G06Q 40/025 705/5 |
| 2017/0011465 | A1* | 1/2017 | Anastassov | G06Q 40/08 |
| 2017/0041737 | A1* | 2/2017 | Fischer | G01P 1/14 |
| 2017/0255966 | A1* | 9/2017 | Khoury | B60W 40/00 |
| 2021/0188290 | A1* | 6/2021 | Jin | G06F 18/24137 |

OTHER PUBLICATIONS

Aug. 2, 2019—(WO) International Search Report & Written Opinion—PCT/US19/32178.

* cited by examiner

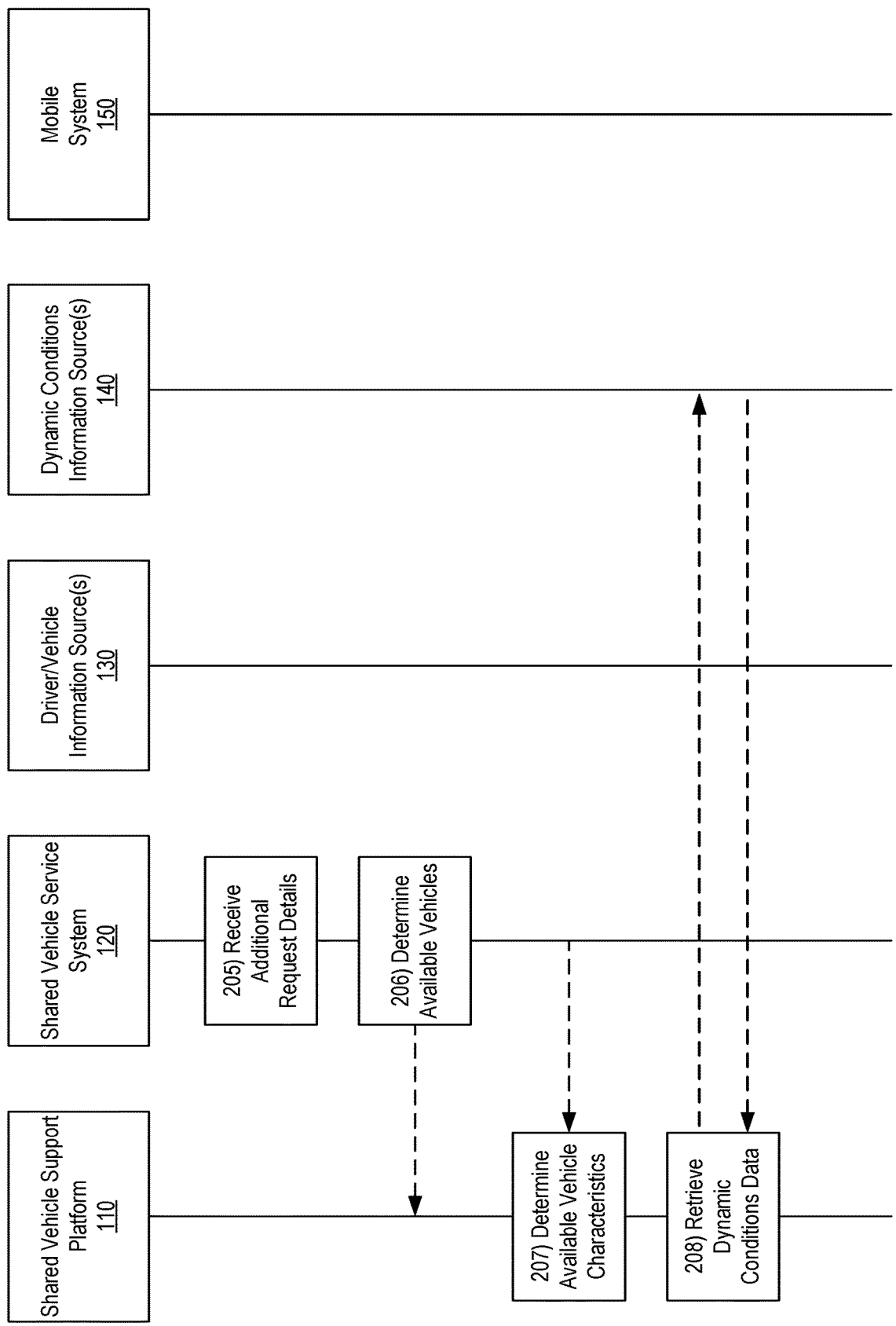

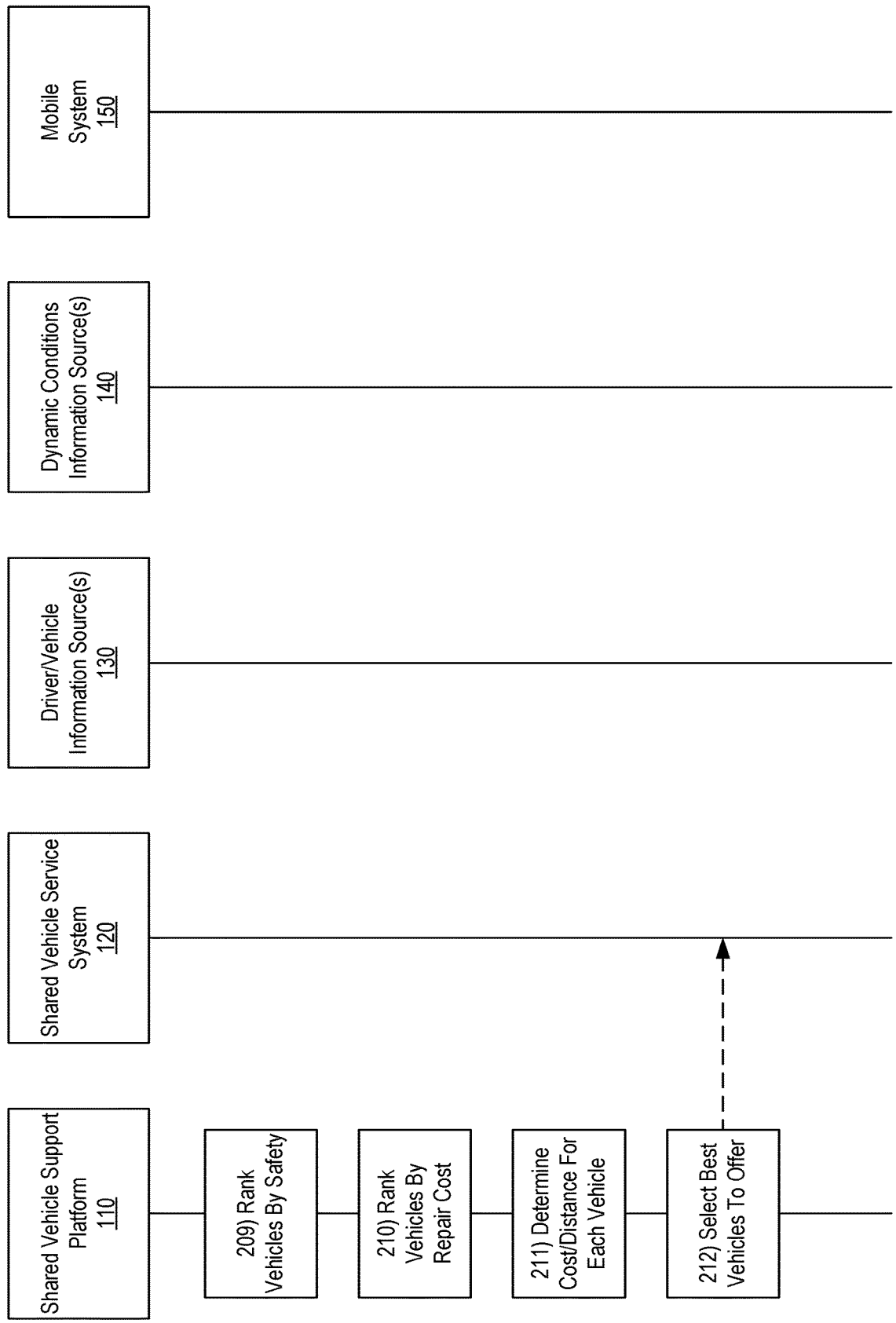

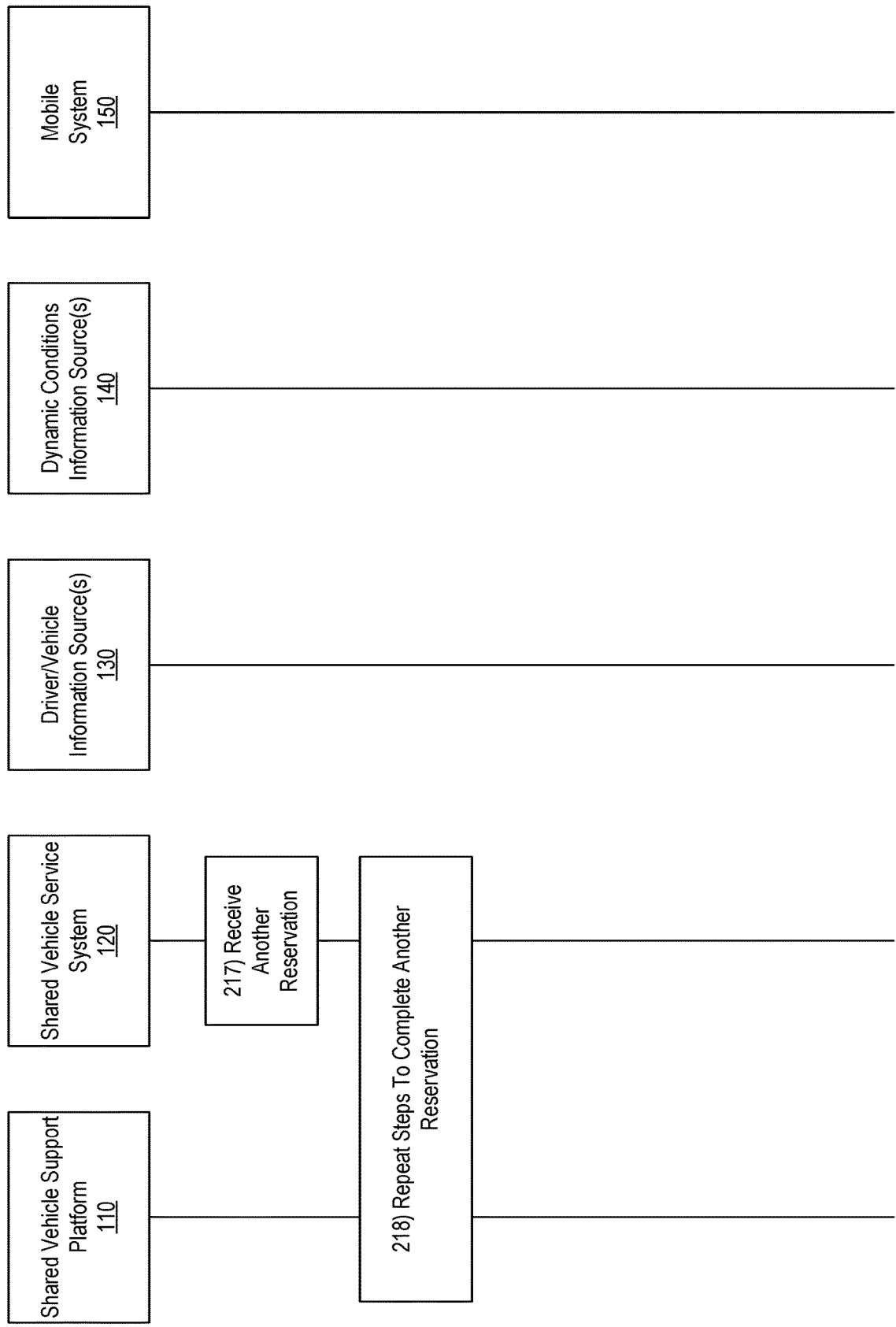

Recommended Vehicles

1. Make/Model 1    Year: 2017
    - Location: 2 blocks away
    - Safety Rating: 96
    - Features: Collision Avoidance
    - [Select]

2. Make/Model 2    Year: 2016
    - Location: 5 blocks away
    - Safety Rating: 94
    - Features: 4 wheel drive
    - [Select]

3. Make/Model 3    Year: 2017
    - Location: 5 blocks away
    - Safety Rating: 95
    - [Select]

[Back]

FIG. 3

Recommended Vehicles

1. Make/Model 1    Year: 2017
    - Location: 2 blocks away
    - Cost/Mile: $.10
    - [Select]

2. Make/Model 2    Year: 2016
    - Location: 5 blocks away
    - Cost/Mile: $.15
    - [Select]

3. Make/Model 3    Year: 2017
    - Cost/Mile: $.20
    - [Select]

[Back]

FIG. 4

MATCHING DRIVERS WITH SHARED VEHICLES TO OPTIMIZE SHARED VEHICLE SERVICES

CROSS-REFERENCE TO RELATED APPLICATIONS

This application claims benefit to U.S. Provisional Application No. 62/671,157 filed May 14, 2018, the contents of which application is incorporated herein fully by reference.

BACKGROUND

Aspects of the disclosure relate to matching drivers to one or more vehicles of a shared vehicle service, such as a car-share service. Shared vehicle services are becoming increasingly common as shared vehicle applications and services continue to improve. Autonomous vehicles may further increase the utility and appeal of shared vehicle services. Despite advances in various technologies, however, it may be difficult to effectively match drivers with shared vehicles in the most efficient way. Such effective matching is hampered by lack of data about drivers and vehicles, especially when a new driver first joins a shared vehicle service.

SUMMARY

Aspects of the disclosure provide effective, efficient, scalable, and convenient technical solutions that address and overcome the technical problems associated with operating shared vehicle services such as car-sharing services safely and effectively. Data regarding drivers and vehicles may be collected and managed in order to effectively match drivers with shared vehicles in a shared mobility context. Shared mobility services may include rideshare services, carpool services, bike sharing services, microtransit services (e.g., scooter-sharing services), autonomous taxi services, peer-to-peer services, and other shared mobility services.

In accordance with one or more embodiments, a computing platform having at least one processor, a memory, and a communication interface may perform a method comprising receiving information indicating a driver requesting a shared vehicle; estimating, based on web browsing information associated with the driver, one or more characteristics of the driver; determining, based on the characteristics of the driver, a driver safety score indicating an estimated risk of an accident involving the driver; selecting, from a plurality of available vehicles, a subset of the plurality of available vehicles based on the driver safety score; and causing the display of a user interface offering the subset of the plurality of available vehicles to the driver.

In some embodiments, the method performed by the computing platform may further include determining, for each of the plurality of available vehicles, information indicating one or more safety features of the vehicle, wherein the selecting the subset of the plurality of available vehicles is further based on the information indicating the one or more safety features of the vehicle. The information indicating the one or more safety features of the vehicle may be a safety score. The method may further comprise ranking the subset of the plurality of available vehicles based on the corresponding safety score of each vehicle. The safety score may be further based on one or more dynamic conditions including weather, traffic, and/or time of day.

In some embodiments, the method performed by the computing platform may further include determining, for each of the plurality of available vehicles, information indicating a repair cost of the vehicle, wherein the selecting the subset of the plurality of available vehicles is further based on the information indicating a repair cost of the vehicle. The information indicating a repair cost of the vehicle may be a repair cost score. The method may further comprise ranking the subset of the plurality of available vehicles based on the corresponding safety score of each vehicle.

In some embodiments, the method performed by the computing platform may further include determining a cost per distance associated with each of the subset of the plurality of available vehicles, wherein causing the display of the user interface further comprises causing display of the cost per distance for each of the subset of the plurality of available vehicles.

In some embodiments, the method performed by the computing platform may further include collecting driving data associated with the driver's use of a selected one of the subset of the plurality of available vehicles; and updating the driver safety score based on the driving data.

In some embodiments, the estimated characteristics may be one or more of an age, gender, or zip code of the driver.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for matching drivers to shared vehicles in accordance with one or more example embodiments;

FIGS. 3 & 4 depict example graphical user interfaces for matching drivers to shared vehicles in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to controlling operation of a shared vehicle service, such as a car-sharing service, in order to match drivers to vehicles for the purpose of improving safety and/or reducing costs. Characteristics of drivers may be estimated or determined based on readily available information, including web browsing information, cookies, and the like. An initial safety score may be determined based on such determined driver characteristics.

Additionally, vehicles may be rated in terms of safety and/or repair cost using different features of the vehicles, vehicle histories, age of the vehicles, availability of parts, and other such information. Based on the respective driver and vehicle information, drivers requesting shared vehicles may be matched to appropriate shared vehicles. Furthermore, additional information about drivers may be gathered by monitoring the usage of shared vehicles, thus allowing more accurate determinations of a driver's safety over time as the driver uses the shared vehicles.

Figure 1A:
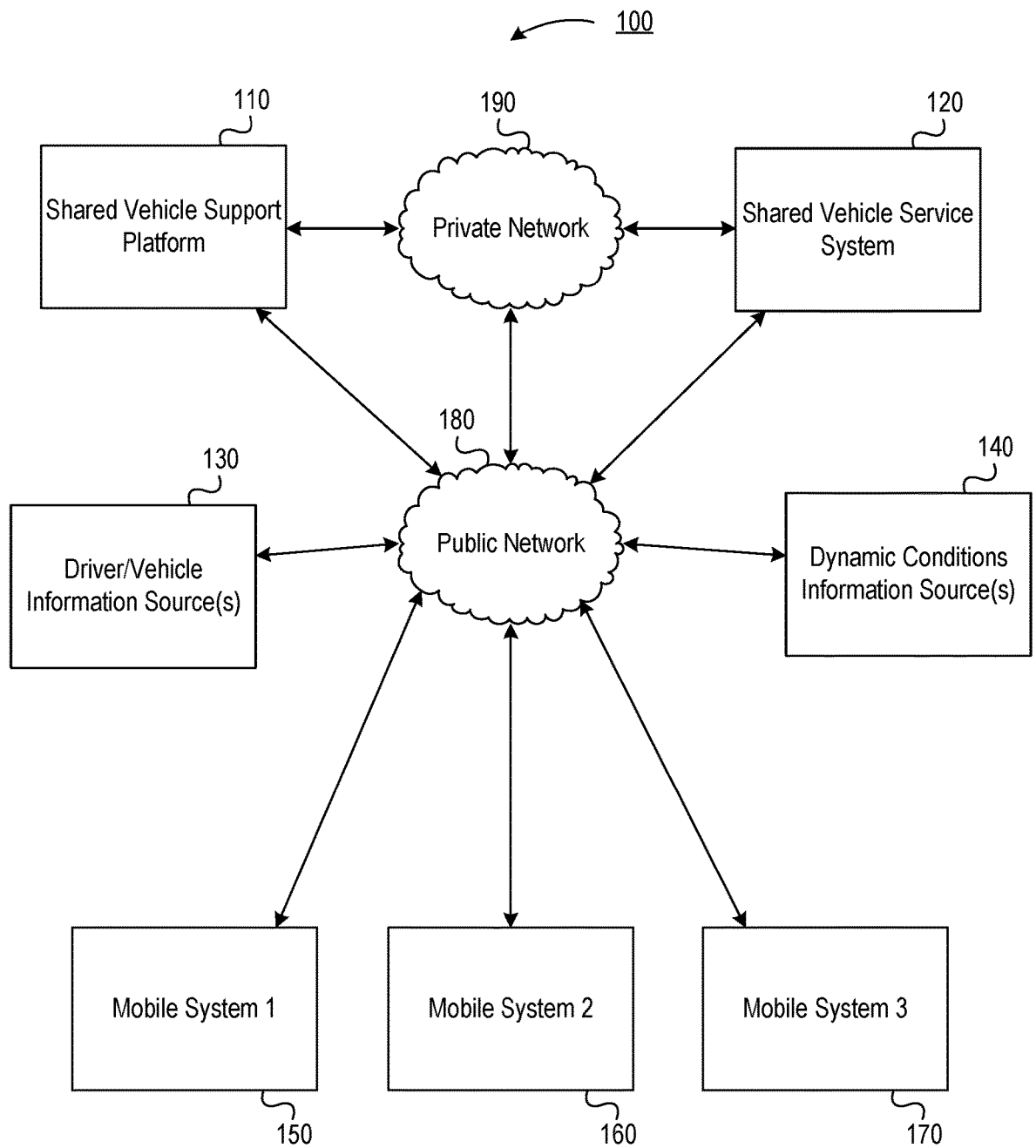
FIGS. 1A-1C depict an illustrative operating environment for matching drivers to shared vehicles in accordance with one or more example embodiments.
Figure 1B:
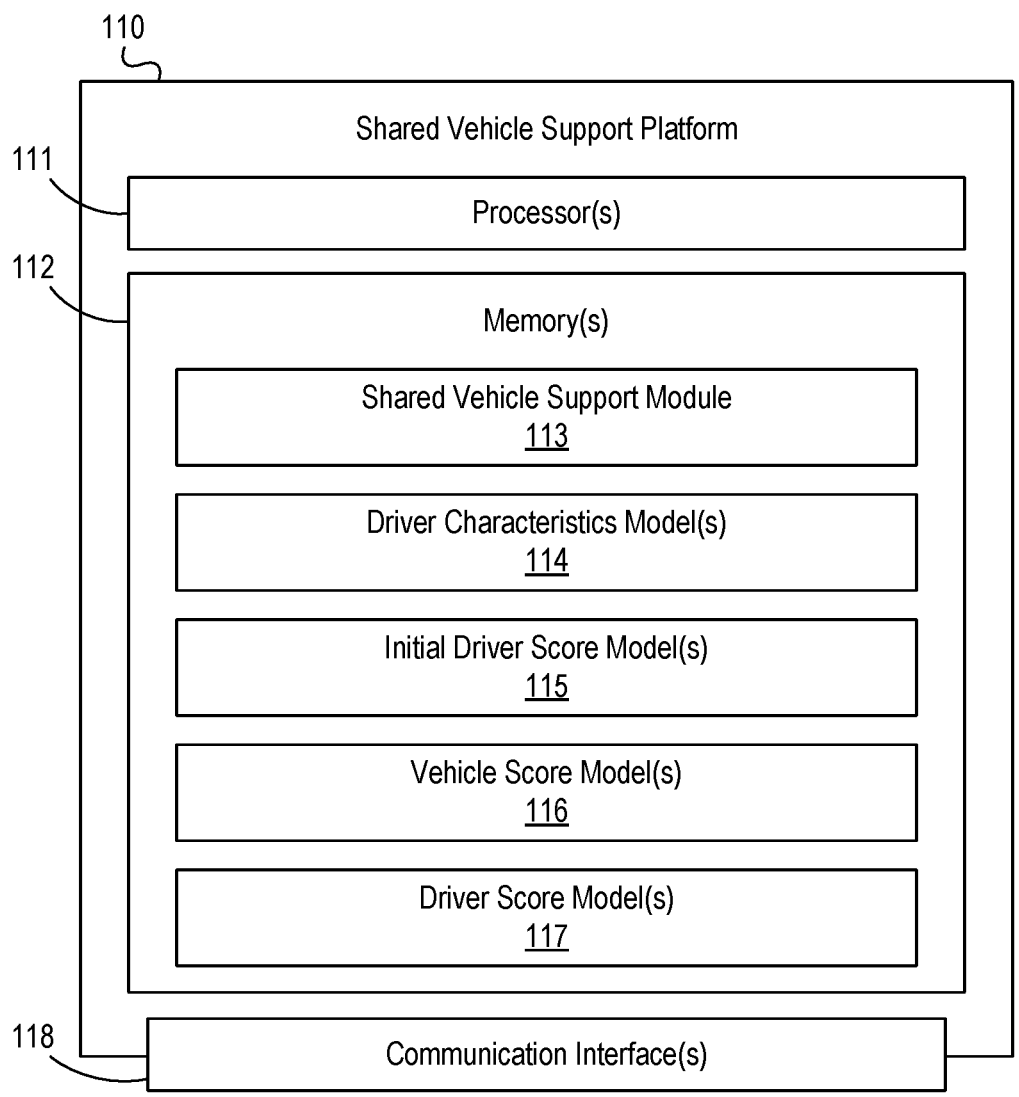
Figure 1C:
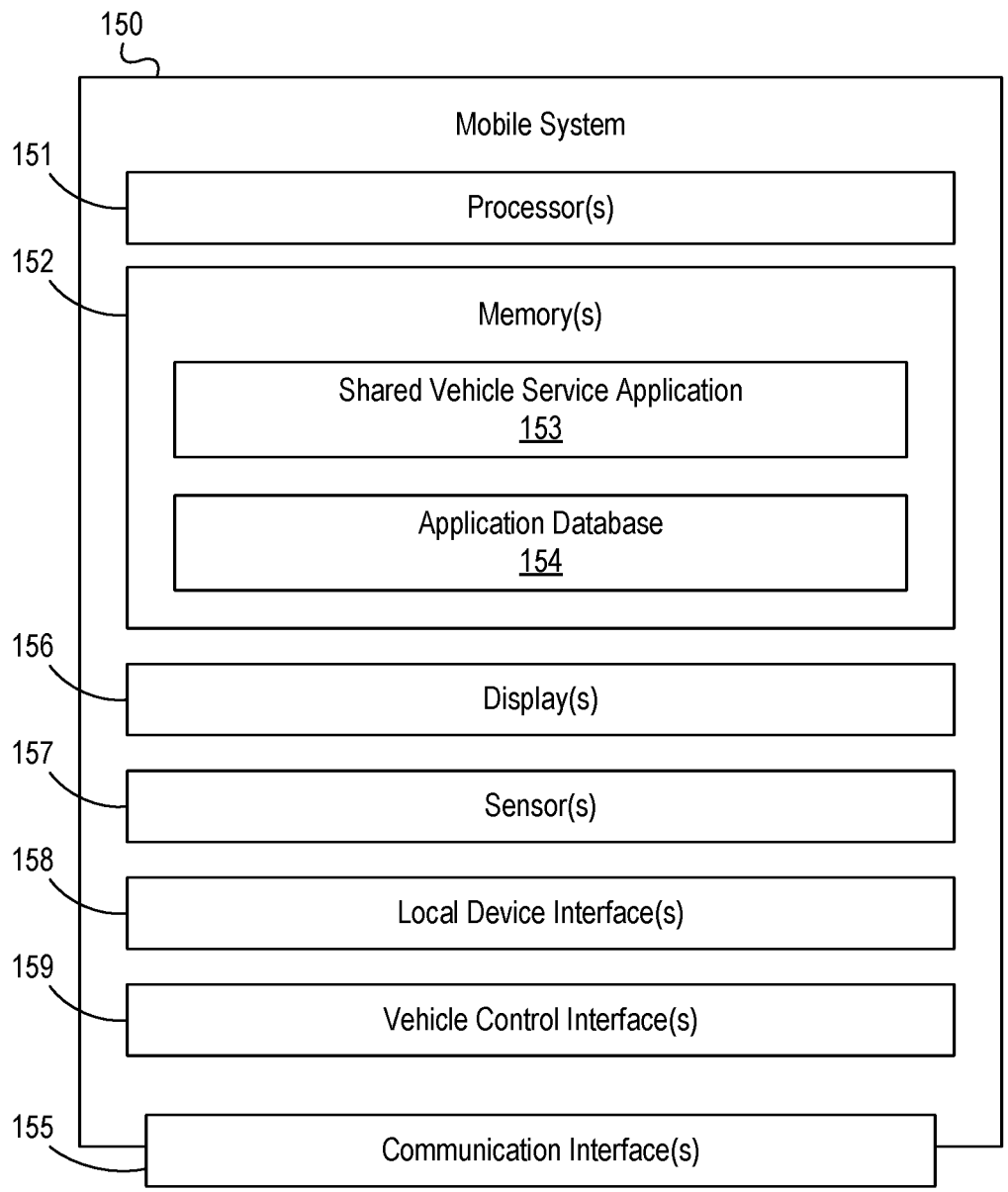

FIGS. 1A, 1B, and 1C depict an illustrative operating environment for controlling operation of a shared vehicle service to match drivers with vehicles in accordance with one or more example embodiments. Referring to FIG. 1A, operating environment 100 may include a shared vehicle support platform 110, a shared vehicle service system 120, driver/vehicle information source(s) 130, dynamic conditions information source(s) 140, a first mobile system 150, a second mobile system 160, and a third mobile system 170. In one or more arrangements, the shared vehicle support platform 110, shared vehicle service system 120, driver/vehicle information source(s) 130, dynamic conditions information source(s) 140, the first mobile system 150, the second mobile system 160, and the third mobile system 170 may be connected by a public network 180 (e.g., the Internet) and/or a private network 190 (e.g., a network associated with a shared vehicle service company), each of which may include one or more wired networks and/or one or more wireless networks. In addition, each of the shared vehicle support platform 110, shared vehicle service system 120, driver/vehicle information source(s) 130, dynamic conditions information source(s) 140, the first mobile system 150, the second mobile system 160, and the third mobile system 170 may be special purpose computing devices configured to perform specific functions, as illustrated in greater detail below, and may include specific computing components such as processors, memories, communication interfaces, and/or the like.

For example, shared vehicle support platform 110 may be configured to control or manage aspects of a shared vehicle service, including receiving and analyzing information about drivers, calculating scores, providing rankings of vehicles according to safety and/or repair costs, and other control functions. Shared vehicle service system 120 may be configured to manage aspects of a shared vehicle service, including receiving requests for vehicles, offering vehicles to drivers, and other shared vehicle service management or control functions. In some embodiments, shared vehicle support platform 110 and shared vehicle service system 120 may be parts of a single shared vehicle management computing platform. Accordingly, functions and/or capabilities ascribed herein to either of shared vehicle support platform 110 and shared vehicle service system 120 may be performed by a single system and/or computing platform. In some embodiments, shared vehicle support platform 110 may be associated with a first organization (e.g., an insurance company), and shared vehicle service system 120 may be associated with a second organization (e.g., a shared vehicle company).

Driver/vehicle information source(s) 130 may be configured to collect, manage, and provide information about drivers and/or vehicles, including demographics data, accident history, vehicle maintenance records, driving habits information, preference information (e.g., online purchase information), and the like. Dynamic conditions information source(s) 140 may be configured to collect and provide information about driving conditions such as weather conditions, road conditions, traffic conditions, and the like.

Mobile systems 150, 160, 170 may be configured to monitor and/or send vehicle guidance data (which may include, e.g., speed data, position data, destination data, and operating status of autonomous mode) associated with corresponding vehicles to shared vehicle support platform 110 and/or one or more other computing devices included in operating environment 100. Mobile systems 150, 160, 170 may be further configured to run one or more applications, including shared vehicle service application 153, for communicating and interfacing with shared vehicle support platform 110, shared vehicle service system 120, and/or other devices connected via public network 180 and/or private network 190. The vehicles associated with mobile systems 150, 160, 170 may be autonomous vehicles.

Referring to FIG. 1B, shared vehicle support platform 110 may include a processor 111, memory 112, and a communication interface 118. Processor 111 may control operations of shared vehicle support platform 110, and memory 112 may store instructions that, when executed by processor 111, cause shared vehicle support platform 110 to perform one or more functions. Communication interface 118 may include one or more wired and/or wireless network interfaces, and communication interface 118 may connect shared vehicle support platform 110 to one or more networks (e.g., public network 180 and/or private network 190) and/or enable shared vehicle support platform 110 to exchange information and/or otherwise communicate with one or more devices connected to such networks. Memory 112 may store and/or otherwise provide a profile module 113. Profile module 113 may store instructions that, when executed by processor 111, cause shared vehicle support platform 110 to compute driver profiles comprising characteristics and/or scores, rank vehicles, and/or perform one or more other functions in support of a shared vehicle service. Driver characteristics model(s) 114, initial score model(s) 115, vehicle score model(s) 116, and driver score model(s) 117 may be used by shared vehicle support platform 110 to calculate one or more scores for use by the shared vehicle support platform, as further described below.

Referring to FIG. 1C, mobile system 150 may include a processor 151, memory 152, and a communication interface 155. In some embodiments, mobile system 150 may be integrated with a vehicle; in some embodiments, mobile system 150 may be a separate device associated with a driver (e.g., a driver's mobile phone or other mobile device), that may optionally communicate with and control functions of the vehicle. Processor 151 may control operations of mobile system 150, and memory 152 may store instructions that, when executed by processor 151, cause mobile system 150 to perform one or more functions. Communication interface 155 may include one or more wired and/or wireless network interfaces, and communication interface 155 may connect mobile system 150 to one or more networks (e.g., public network 180 and/or private network 190) and/or enable mobile system 150 to exchange information and/or otherwise communicate with one or more devices connected to such networks. Memory 152 may store and/or otherwise provide a shared vehicle service application 153 and an application database 154. Shared vehicle service application 153 may store instructions that, when executed by processor 151, cause mobile system 150 to interface and communicate with shared vehicle support platform 110 and/or shared vehicle service system 120 in order to reserve vehicles, exchange data, and perform other shared vehicle service functions. Application database 154 may store information that may be used by mobile system 150 for executing and performing the functions of the shared vehicle service application 153.

Mobile system 150 also may include a display 156, sensors 157, a local device interface 158, and a vehicle control interface 159. Display 156 may display one or more user interfaces for a driver of a vehicle containing mobile system 150. Display 156 may accept input (e.g., via a touchscreen interface) and/or be associated with one or more user interfaces that accept input related to the displayed user interfaces. Sensors 157 may sense conditions associated with a vehicle in which mobile system 150 may be located and may output analog signal data and/or digital signal data to mobile system 150. Such data collected via sensors 157 may include engine data, performance data, navigation data, position data, speed data, acceleration data, braking data, and/or other vehicle data. Local device interface 158 may include one or more wired and/or wireless communication interfaces and may, for example, enable mobile system 150 to exchange information with and/or otherwise communicate with one or more devices that may be located inside of, close to, and/or within a predetermined distance of a vehicle in which mobile system 150 may be located. For example, local device interface 158 may enable mobile system 150 to communicate with one or more smart phones, tablet computers, and/or other mobile computing devices that may be used by and/or otherwise associated with a driver of a vehicle in which mobile system 150 may be located. Vehicle control interface 159 may include one or more wired and/or wireless communication interfaces and may, for example, enable mobile system 150 to exchange information with and/or otherwise communicate with one or more devices and/or components of an autonomous vehicle in which mobile system 150 may be located so as to direct and/or control the autonomous vehicle in which mobile system 150 may be located. For example, vehicle control interface 159 may enable mobile system 150 to accelerate and/or decelerate the autonomous vehicle in which mobile system 150 may be located, steer the autonomous vehicle in which mobile system 150 may be located, direct the autonomous vehicle in which mobile system 150 may be located to one or more specific locations, drive the autonomous vehicle in which mobile system 150 may be located, and/or otherwise control operations of the autonomous vehicle in which mobile system 150 may be located.

Figure 2A:
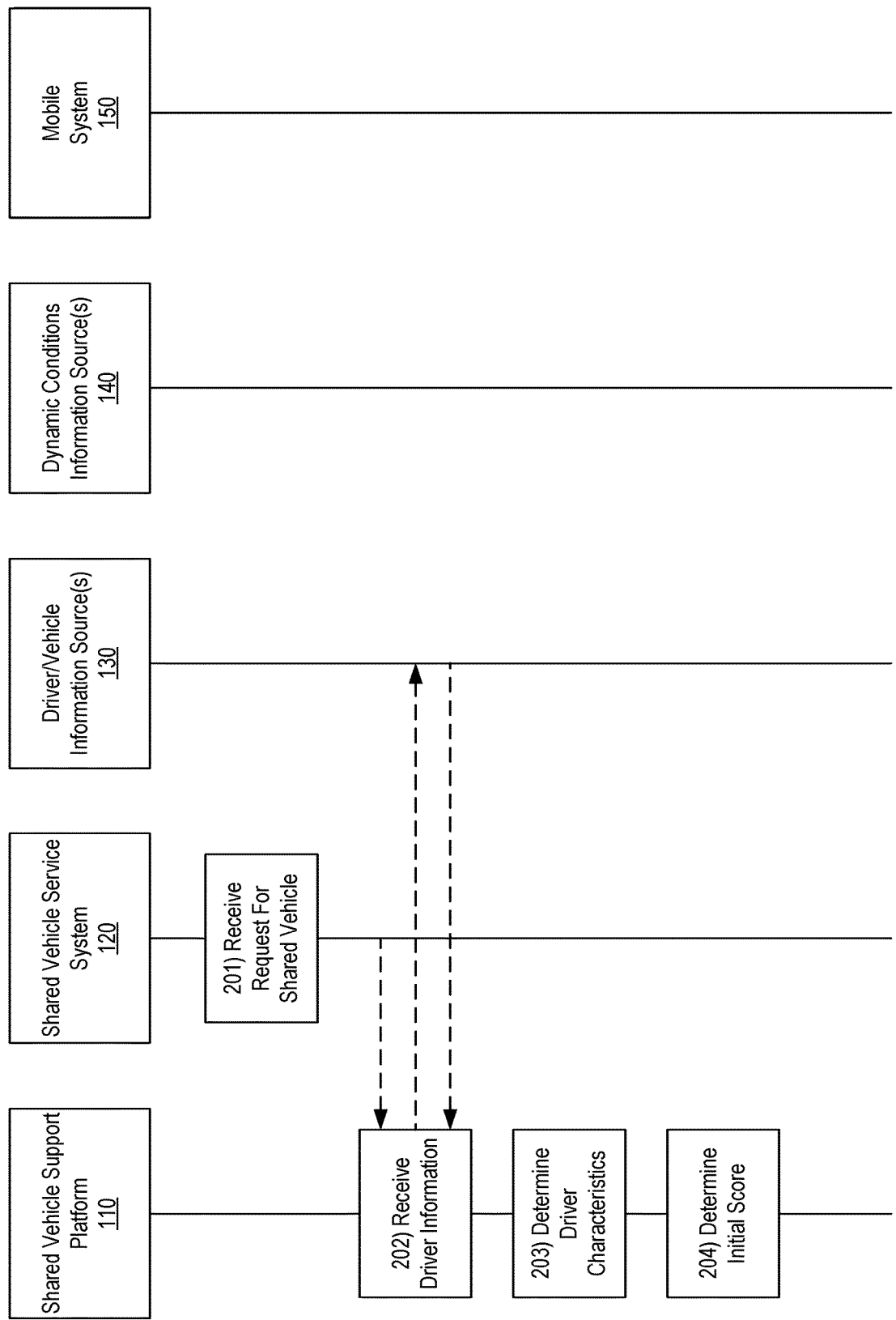

FIGS. 2A-2E depict an illustrative event sequence for controlling operation of a shared vehicle service based on driver profiles. Referring to FIG. 2A, at step 201, shared vehicle service system 120 may receive a request for a shared vehicle. The request for a shared vehicle may be received, for example, by a web server operated by the shared vehicle service system 120 that serves a website comprising one or more web pages for the shared vehicle service. For example, step 201 may be triggered by a user first navigating to a shared vehicle service home page, by a user selecting a "reserve car" operation located on a shared vehicle service web page, or via some other interaction with a website corresponding to the shared vehicle service. In another example, the request for a shared vehicle may be received in response to a user's interaction with an application (e.g., the shared vehicle service application 153 running on a user's mobile device, which may be the mobile system 150 or some other device), such as a user starting the application, selecting a "reserve car" function via the application, or some other interaction with the application 153.

In some embodiments, the request may include information and/or the shared vehicle service system 120 may gather information in response to the request. For example, in response to the user's request, the shared vehicle service system 120 may receive cookies from the user's system and/or from a third party system. As another example, the shared vehicle service system 120 may receive identifier(s) associated with the user (e.g., one or more of an IP address, an account name, an email address, and/or some other user and/or device identifier). Based on the identifier, the shared vehicle service system 120 may retrieve account information identifying the user or characteristics of the user (e.g., a user's name, address, location, demographic information, driver's license information, etc.), which may be stored by the shared vehicle service system 120.

At step 202, the shared vehicle support platform 110 may receive information about the user of step 201 from the shared vehicle service system 120 and/or other sources. For example, the shared vehicle service system 120 may send one or more web cookies associated with the user that visited the website associate with the shared vehicle system to the shared vehicle support platform 110. The web cookies may be retrieved from a user's device (e.g., the device used to access the shared vehicle website) and/or from a third party service. Additionally or alternatively, the shared vehicle service system 120 may send identifier(s) associated with the user (e.g., one or more of an IP address, an account name, an email address, and/or some other user and/or device identifier) to the shared vehicle support platform 110. Additionally or alternatively, the shared vehicle service system 120 may send account information associated with the user (e.g., the user's name, address, demographic information, driver's license information, etc.) to the shared vehicle support platform 110.

The shared vehicle support platform 110 may gather additional information about the user identified by the information received from the shared vehicle service system 120 by transmitting a request to and receiving additional information from one or more of driver/vehicle information source(s) 130. For example, shared vehicle support platform 110 may send information including a driver's license number to a server associated with a local government as part of a query for a motor vehicle report (MVR) comprising a driving history. Shared vehicle support platform 110 may also send identification information to one or more servers that provide offline data records, such as purchase history, and/or online behavior records, such as websites visited, videos watched, and other such information. The driver/vehicle information source(s) 130 may retrieve the requested information and return the information to shared vehicle support platform 110, as illustrated.

At step 203, shared vehicle support platform 110 may determine one or more driver characteristics based on user information received from the shared vehicle service system 120 and/or driver/vehicle information sources at step 202. For example, the shared vehicle support platform 110 may determine demographic information such as age, gender, and zip code based on the information received at step 202. As another example, the shared vehicle support platform 110 may determine one or more preferences (e.g., likes and/or dislikes) based on the information received at step 202.

Shared vehicle support platform 110 may use one or more models to estimate driver demographics and/or preferences. For example, a driver characteristic model 114 may be used to estimate driver demographics based on information received at step 202. Such a driver characteristic model 114 may be trained to predict demographic information based on input information that may include, for example, web cookies, web browsing data or other online behavior data, location information, or any other information received at step 202. Additionally or alternatively, a driver characteristic model 114 may be used to estimate driver preferences based on input information that may include, for example, web cookies, web browsing data or other online behavior data, location information, or any other information received at step 202.

Accordingly, the shared vehicle support platform 110 may have previously trained one or more driver characteristic model(s) 114 to estimate demographic information and/or driver preference information based on particular input data using a training data set. The driver characteristic model(s) 114 may be trained using machine-learning techniques, statistical techniques, and/or other such techniques for correlating one or more input features with training data. The shared vehicle support platform 110 may train the one or more models prior to executing the method of FIGS. 2A-2E. For example, to estimate demographic information, the training data may include target variable(s) indicating demographic information correlated with input data of the type that may be received at step 202. Similarly, to estimate driver preferences, the training data may include target variable(s) indicating preference information correlated with input data of the type that may be received at step 202. Such driver characteristic model(s) 114 may be trained to output one of various demographic groups and/or preferences classifying a particular user into a particular demographic classification (e.g., age, gender, and/or zip code) and/or preferences (e.g., likes and/or dislikes).

In some cases, some or all of the driver characteristic information may be known because it was supplied by the user and/or obtained from one or more driver/vehicle information sources 130. In these cases, the shared vehicle support platform 110 may avoid estimating the known information (e.g., to conserve processing resources) or may estimate the driver characteristic information as a check on the known information (e.g., as a sanity check to ensure the received information was correct). For example, in some cases, the shared vehicle support platform 110 may have received driver demographics information supplied by the shared vehicle service system 120 and/or driver/vehicle information sources 130, and thus may avoid estimating driver demographics information and/or estimate the demographic information as a sanity check. In the same example, the shared vehicle support platform 110 may not have received driver preference information and so may proceed to estimate the driver preference information.

At step 204, the shared vehicle support platform 110 may determine an initial score for the driver based on the driver demographic information and/or based on other information associated with the driver. The shared vehicle support platform 110 may use an initial score model 115 to estimate the initial score.

The initial score model 115 may be trained using machine-learning techniques, statistical techniques, and/or other such techniques for correlating one or more features with historical outcome data. The shared vehicle support platform 110 may train the one or more models prior to executing the method of FIGS. 2A, 2B, 2C, 2D, and 2E. The training data may include indications of safety for a number of drivers. Accordingly, the initial score model 115 may calculate an initial score that estimates, for example, safety for a driver of the shared vehicle service. The shared vehicle support platform 110 may train the initial score model 115 using training data that correlates demographic or other information with indicators of safety. For example, the training data set may correlate age/gender/zip or other input information with indicators of driver safety that may include accident data, tickets, license suspensions and/or cancellations, the cost of insuring a driver, and the like. In some embodiments, the initial score model 115 may be trained to output a continuous value indicating an estimated insurance cost (e.g., in dollars) per mile of driving. Additionally or alternatively, a model may be trained to output a discrete value indicating, for example, an estimated range of an insurance cost (e.g., in dollars) per mile of driving. For example, the model may classify a driver or rider into one of 5 discrete insurance cost/mile categories.

Accordingly, at step 204, shared vehicle support platform 110 may use the received driver information and/or determined driver characteristics (e.g., including demographic information) obtained at step 202 and/or step 203 as inputs to the initial score models 115. In some embodiments, shared vehicle support platform 110 may extract and/or calculate features from the received driver information and/or determined driver characteristics before using the features as inputs to the initial score model 115. Shared vehicle support platform 110 may then determine, using the initial score model 115, an initial score. In some embodiments, the initial score model 115 may also output a confidence level. The confidence level may reflect a relatively lower or higher confidence based, for example, on an amount of information that was input to the model, on a similarity between the information and training data used to train the one or more models, and the like.

Referring to FIG. 2B, at step 205, the shared vehicle service system 120 may receive additional information about the request for a vehicle. For example, the shared vehicle service system 120 may receive information from a user that wishes to reserve a vehicle such as a location of the user, a destination of the user, times between which the user wishes to reserve the vehicle, and the like. For the example, the user may navigate through a website provided by shared vehicle service system 120 and/or an application 153 that exchanges data with shared vehicle service system 120 to access menus and make selection(s) indicating the additional request details. In some embodiments, some or all of the additional data may have been previously received (e.g., at step 201).

At step 206, the shared vehicle service system 120 may determine a number of available vehicles that meet the criteria of the driver's request. For example, the shared vehicle service system 120 may determine those vehicles, of the vehicles that may be reserved, rented, or otherwise shared, that will be available at the times requested by the user and currently are or will be nearby (e.g., within a threshold distance of) the user at time the requested reservation begins. Additionally or alternatively, the shared vehicle service system 120 may determine availability based on whether each vehicle has sufficient fuel (e.g., gas, electric charge, and/or other types of fuel) to drive to a destination specified by a user and/or for an estimated distance desired by the user, and the shared vehicle service system 120 may exclude from the list of available vehicles the vehicles that fall below a determined fuel amount. The shared vehicle service system 120 may then transmit the list of available vehicles to the shared vehicle support platform 110.

In some embodiments, instead of or in addition to the shared vehicle service system 120 performing step 206 as illustrated, the shared vehicle support platform 110 may perform step 206. Therefore, the shared vehicle support platform 110 may maintain a database of vehicles associated with the shared vehicle service system 120, and the database may specify the reservation status and/or location of each vehicle at various times including the current time and the future, as well as fuel information and the like.

At step 207, the shared vehicle service system 120 may transmit, and the shared vehicle support platform 110 may receive, further information about the list of available vehicles. Such information may include an age of each vehicle, make/model/color information, fuel economy information, autonomous features, etc. The information may further include safety ratings for each vehicle and repair cost information for each vehicle. The safety rating may be a numerical or categorical (e.g., one through five stars) score indicating the safety features of the vehicle, such as airbags, crumple zones, collision avoidance systems, and the like. In some embodiments, several safety ratings may be assigned to a particular vehicle for various dynamic conditions. For example, a vehicle may have separate safety ratings for normal conditions, for snowy conditions (indicating, e.g., whether the vehicle has snow tires, 4×4, traction control, or other features that aid in snowy driving), for rainy conditions (indicating, e.g., whether the vehicle has traction control or other features that aid in rainy driving), for night driving (indicating, e.g., whether the vehicle has bright headlights or other features that aid in night driving), for heavy traffic (indicating, e.g., whether the vehicle has collision avoidance, lane-keeping, or other features that aid in heavy traffic driving), and the like. Thus, the vehicle safety ratings may vary based on the features of various vehicles (e.g., as indicated by manufacturer information for each make/model/trim of vehicle) as well as aftermarket features such as snow tires, upgraded headlights, and the light. Accordingly, shared vehicle service system 120 may maintain a database of safety features of each vehicle and regularly update the database.

The vehicle repair cost information may include repair cost ratings for each vehicle. The repair cost ratings may be determined based on an age of the vehicle, an availability of parts, availability of auto mechanics, average costs of replacement parts, and other information that may affect a cost to repair a vehicle. The repair cost ratings may be a numerical or categorical (e.g., least through most expensive) score indicating the repair costs of the vehicle in comparison to other vehicles.

In some embodiments, rather than providing a safety score for each vehicle, the shared vehicle service system 120 may provide a list of safety-related features for each vehicle and the shared vehicle support platform 110 may calculate the one or more safety ratings, including multiple safety ratings for various dynamic conditions data. The shared vehicle support platform 110 may use a ruleset that increases a particular score for certain safety features (e.g., +10 points to each conditions score for airbags, +10 points to a heavy traffic conditions score for collision avoidance, +5 points to other dynamic conditions scores for collision avoidance, +10 points to a snow conditions score for snow tires, etc.) and may decrease a score for other features (e.g., −10 points for a high center of gravity, −5 points for a certain vehicle weight, etc.).

Additionally or alternatively, the shared vehicle support platform 110 may use one or more vehicle score models 116 trained to calculate a vehicle safety rating based on various vehicle attributes, including safety-related features and other features. The one or more vehicle score models 116 may calculate various vehicle safety scores for various conditions. For example, a first model 116 may calculate a normal conditions vehicle safety rating, a second model 116 may calculate a snowy weather vehicle safety rating, another model 116 may calculate a heavy traffic vehicle safety rating, and the like.

The vehicle score model(s) 116 may be trained using machine-learning techniques, statistical techniques, and/or other such techniques for correlating one or more features with historical safety data. The shared vehicle support platform 110 may train the model prior to executing the method of FIGS. 2A-2E. The historical safety data may include indications of safety for a number of vehicles and/or vehicle incidents, such as severity of an accident, injuries, and property damage. The shared vehicle support platform 110 may train the vehicle score model(s) 116 using training data that correlates vehicle features, dynamic conditions data, and historical safety data. For example, the training data set may correlate vehicle safety features (e.g., collisions avoidance, airbags, etc.) with indicators of safety that may include number of accidents, severity of accidents, injuries per accident, total injuries, severity of injures, and the like. In some embodiments, the vehicle score model 116 may be trained to output a continuous value indicating a vehicle safety rating. Additionally or alternatively, a model 116 may be trained to output a discrete value indicating, for example, a discrete safety rating (e.g., 1-5 stars).

Accordingly, the vehicle score model 116 may calculate a vehicle safety score for each vehicle associated with a shared vehicle service and may store the vehicle safety score in memory 112. The shared vehicle support platform 110 may thus calculate a vehicle safety rating and/or obtain a stored vehicle safety rating for each available vehicle at step 207 using one or more vehicle score models 116.

Similarly, the shared vehicle support platform 110 may determine a vehicle repair cost score for each vehicle. The shared vehicle support platform may receive (e.g., from shared vehicle service system 120) data about each vehicle such as make/model/year, repair history, current problems, and the like. The shared vehicle support platform 110 may then obtain information about parts availability for particular vehicles, parts pricing data, location of mechanics, number of mechanics that service a particular make of vehicle, location of mechanics, and other such data from one or more driver/vehicle information sources 130. The shared vehicle support platform 110 may use this data to determine a repair cost score for each vehicle. For example, the shared vehicle support platform 110 may use a ruleset specifying a default score for a particular make/model/year of vehicle, then boost or lower the score based on information about parts availability for particular vehicles, parts pricing data, location of mechanics, number of mechanics that service a particular make of vehicle, location of mechanics, and other such data received from the driver/vehicle information sources 130.

Thus, after performing step 207, the shared vehicle support platform 110 may have obtained and/or determined data about the available vehicles, including a vehicle safety score and a vehicle repair cost score for each vehicle.

At step 208, the shared vehicle support platform 110 may obtain dynamic conditions data specifying dynamic conditions in the vicinity of the user, the destination of the user, and/or along a route that a user may follow while driving the shared vehicle. Accordingly, the shared vehicle support platform 110 may send one or more queries to dynamic conditions information source(s) 140 to retrieve information about dynamic conditions such as weather and traffic at one or more locations and times for which the user will be using the shared vehicle. For example, the shared vehicle support platform 110 may send a query for each hour that the user will have the shared vehicle. Each query may specify an estimated location, which may be a city/state, coordinates, or the like. The shared vehicle support platform 110 may estimate the location for each query based on pickup and/or drop-off locations specified in the shared vehicle request (e.g., as received at steps 201 and/or 205). For example, if a user requested a shared vehicle for 4 hours with a pickup in a city and for drop-off in the same city, the shared vehicle support platform 110 may estimate that the shared vehicle will remain in the city and therefore send 4 dynamic conditions queries requesting dynamic conditions within the city for each hour of the reservation. As another example, if a user requested a shared vehicle for 4 hours with a pickup in a first city and a drop-off in a second city, the shared vehicle support platform 110 may estimate that the user will be in the first city for the first hour, in the second city for the fourth hour, and in between for the second and third hours. The shared vehicle support platform 110 may thus request dynamic conditions for the various estimated locations of the user during the reservation.

Turning to FIG. 2C, at step 209, the shared vehicle support platform 110 may rank the available vehicles by safety. The ranking of vehicles may take into account both a vehicle safety score (e.g., as received and/or determined at step 207) and a driver's initial score (e.g., as determined at step 204). For example, the shared vehicle support platform 110 may multiply a numeric safety rating for each vehicle times a numeric initial score for the driver to obtain a driver/vehicle safety score for each vehicle. The shared vehicle support platform 110 may then rank the vehicles by the driver/vehicle safety score.

In some cases, the shared vehicle support platform 110 may use conditions-specific vehicle safety scores to determine the driver/vehicle safety scores. For example, if the conditions are snowy, a snowy weather vehicle safety score may be used to determine the driver/vehicle safety score. If multiple dynamic conditions are present (e.g., if conditions are snowy and heavy traffic), then multiple dynamic conditions scores may be combined (e.g., by averaging) and the combined score may be used to determine the driver/vehicle safety score. Similarly, if dynamic conditions data are estimated to change throughout a driver's reservation, the multiple conditions-specific scores may be combined in proportion to the time spent in each condition (e.g., using weighted averages). For example, if the first three hours of a reservation are estimated to be sunny, and the fourth hour of a reservation is estimated to be rainy, then the shared vehicle support platform 110 may determine a weighted average of the normal conditions vehicle safety score (which may be triple weighted to reflect the 3:1 proportion of time in sunny weather vs. rainy weather) and the rainy conditions vehicle safety score.

If the shared vehicle support platform 110 did not determine conditions-specific vehicle safety scores (e.g., if only a single safety score was received or determined at step 207), then the shared vehicle support platform 110 may boost or reduce the driver/vehicle safety scores based on various dynamic conditions data. For example, the driver/vehicle safety scores may be reduced by 20 points for snowy weather, reduced by 10 points for heavy traffic, increased by 5 points for light traffic, etc.

The shared vehicle support platform 110 may sort the vehicles into different safety tiers based on the driver/vehicle safety scores. For example, vehicles with a driver/vehicle safety score of less than a first threshold may be placed into a "least safe" tier, vehicles with a driver/vehicle safety score above the first threshold but below a second threshold may be placed into a "safe" tier, and vehicles with a driver/vehicle safety score above the second threshold may be placed into a "safest" tier. In some cases, the shared vehicle support platform 110 may drop, from the list of available vehicles, vehicles in the "least safe" tier. In some cases (e.g., if a large number of "safest" vehicles are available), the shared vehicle support platform 110 may also drop vehicles in the "safe" tier from the list of available vehicles.

Additionally or alternatively, the shared vehicle support platform 110 may simply drop all vehicles below a threshold number based on the rankings. For example, the shared vehicle support platform 110 may only consider the top 15 vehicles of the ranked list of available vehicles by safety.

At step 210, the shared vehicle support platform 110 may rank the available vehicles by repair cost. In some cases, the shared vehicle support platform 110 may rank the vehicles using the vehicle repair cost rating. Additionally or alternatively, the shared vehicle support platform 110 may combine the vehicle repair cost rating with the driver's initial score (e.g., by dividing the driver's initial score by the vehicle repair cost rating) to calculate a driver/vehicle repair cost.

The shared vehicle support platform 110 may then sort the vehicles into different repair cost tiers based on the driver/vehicle repair cost scores. For example, vehicles with a driver/vehicle repair cost score of less than a first threshold may be placed into a "most expensive" tier, vehicles with a driver/vehicle repair cost score above the first threshold but below a second threshold may be placed into an "average" tier, and vehicles with a driver/vehicle safety score above the second threshold may be placed into a "least expensive" tier. In some cases (e.g., if a large number of "least expensive" vehicles are available), the shared vehicle support platform 110 may drop vehicles in the "most expensive" tier and/or the "average" tier. Additionally or alternatively, the shared vehicle support platform 110 may simply drop all vehicles below a threshold number based on the rankings. For example, the shared vehicle support platform 110 may only consider the least expensive 15 vehicles of the ranked list of available vehicles.

At step 211, the shared vehicle support platform 110 may determine a cost per distance associated with each vehicle. The cost per distance may indicate how much a driver will be charged to drive a vehicle per a unit of distance (e.g., per mile, per kilometer, etc.). The shared vehicle support platform 110 may determine the cost per distance based on one or more of the initial driver score, the vehicle safety score, and the vehicle repair cost score. For example, the shared vehicle support platform 110 may use a formula that calculates the cost per distance by multiplying some constant value times the driver safety score and the vehicle safety score, then divides the result by the vehicle repair cost score. Other formulas could be used. For example, the cost per distance calculation could also incorporate an age of the vehicle in order to reduce the cost to drive an older vehicle.

At step 212, the shared vehicle support platform 110 may select one or more best vehicles to offer to the requesting driver. The shared vehicle support platform 110 may select one or more best vehicles based on the safety ranking and/or on the repair cost ranking. For example, the shared vehicle support platform 110 may select the vehicles that rank in both the "safest" tier and in the "least expensive" tier. If no vehicles (or less than a threshold number of vehicles) rank in both the "safest" tier and the "least expensive" tier, then the shared vehicle support platform 110 may recommend vehicles in one or more lower tiers (e.g., vehicles in "safe" tier and the "least expensive" tier, vehicles in the "safest" tier and the "average" cost tier, etc.). The shared vehicle support platform 110 may proceed in this way (e.g., selecting vehicles in progressively lower tiers) until it reaches a set number of vehicles to recommend.

In some examples, the shared vehicle support platform 110 may rank the one or more best vehicles for the requesting driver. For example, the shared vehicle support platform 110 may select the "safest" tier vehicles, then rank the "safest" tier vehicles in order of repair cost. The shared vehicle support platform 110 may then select the "safe" tier vehicles, then rank the "safe" tier vehicles after the "safest" tier vehicles in order of repair cost. Other orderings may also be used. For example, the shared vehicle support platform 110 may select the "least expensive" tier vehicles and rank them according to safety; then select the "average" cost tier vehicles and rank them after the "least expensive" tier vehicles according to safety, etc.

As another example ordering, the shared vehicle support platform 110 may select the top X (e.g., 10) safest vehicles, then rank the top X vehicles according to repair cost to yield the one or more best vehicles. As another example ordering, the shared vehicle support platform 110 may select the top X (e.g., 10) least expensive repair cost vehicles, then rank the top X vehicles according to safety to yield the one or more best vehicles.

In some cases, the driver's initial score may be used to select the ranking. For example, a driver with a certain initial score may receive a selection of vehicles according to one ordering, and a driver with a different score may receive a selection of vehicles according to a different ordering. The shared vehicle support platform 110 may categorize drivers in different initial score categories using various thresholds and them select an ordering based on the category.

After determining the one or more best vehicles, the shared vehicle support platform 110 may transmit indications of the one or more best vehicles to the shared vehicle service system 120 as illustrated. The shared vehicle support platform 110 may further transmit vehicle information that shared vehicle support platform 110 calculated or determined (e.g., at step 207), such as a vehicle safety rating and/or vehicle repair cost rating, for each vehicle.

Figure 2D:
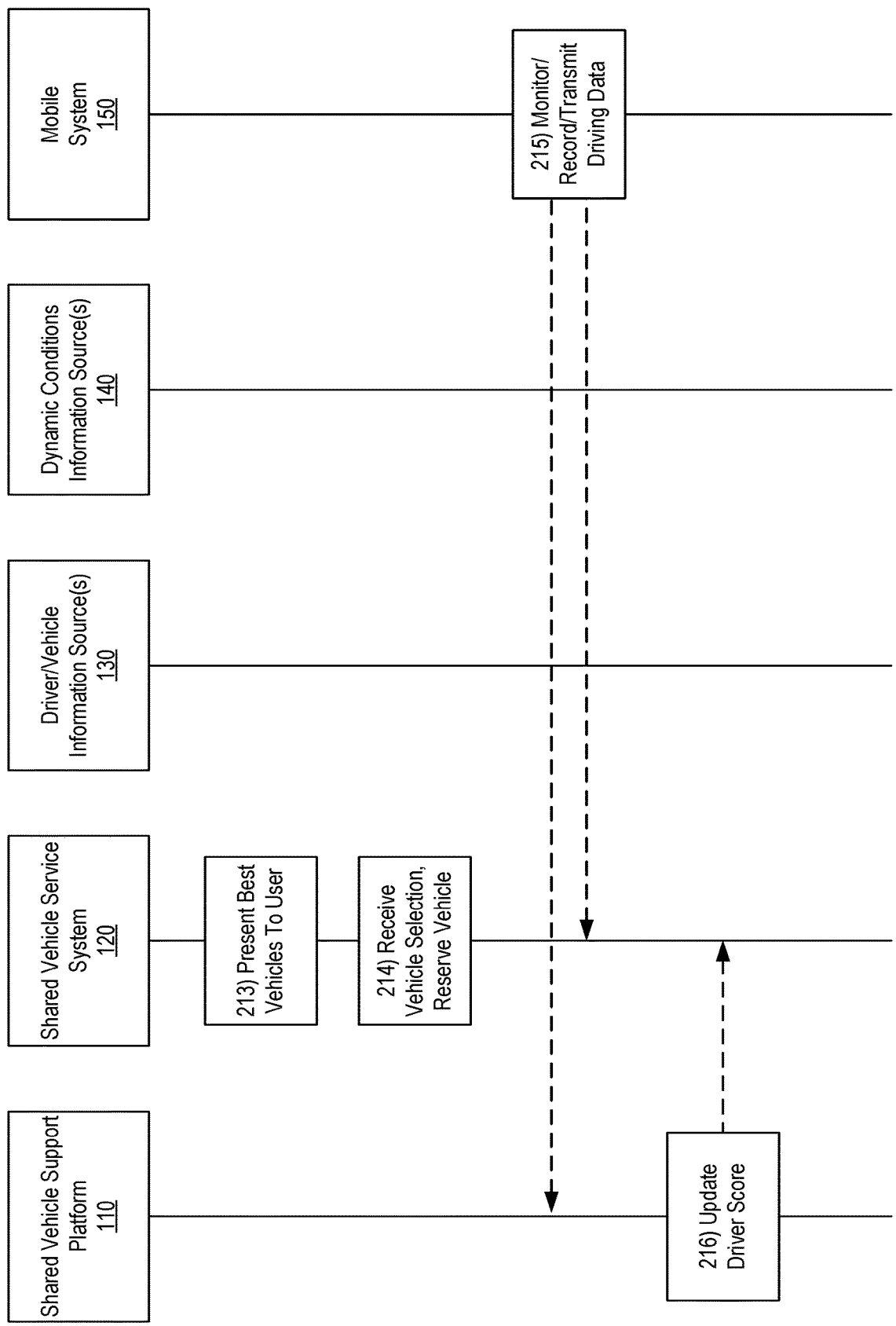

Turning to FIG. 2D, at step 213, responsive to receiving the indications of the one or more best vehicles from the shared vehicle support platform 110, the shared vehicle service system 120 may present a list of the one or more best vehicles to the user. For example, the shared vehicle service system 120 may create a web page and transmit it to the user for rendering in a browser, transmit information for rendering in an application of the user, or otherwise generate and transmit user interface information that may be displayed to the user. The user interface may provide a selection of vehicles (e.g., some or all of the best vehicles), which may be presented in a ranked order as indicated by the shared vehicle support platform 110. The user interface may include information about each vehicle, and the user may select one of the one or more best vehicles.

FIG. 3 illustrates an example user interface 300 that lists several vehicles for selection by a user of the shared vehicle service. The user interface 300 may display a list of vehicles for selection and information about each vehicle. As illustrated, the information may include make/model/year information for each vehicle, a location relative to the user, a safety rating (e.g., as determined at step 207), and vehicle features including safety features and/or other features. In some embodiments, the user interface 300 may further include a map showing the location of each vehicle, an image of each vehicle, a color of each vehicle, an amount of fuel in each vehicle, and other such information about each vehicle that may aid the user in selecting a vehicle.

FIG. 4 illustrates another example user interface 400 that lists several vehicles for selection by a user of the shared vehicle service. The user interface 400 may display a list of vehicles for selection and information about each vehicle. As illustrated, in addition to the information discussed above for FIG. 4 the user interface 400 may include cost/mile information illustrating a cost to the driver associated with each vehicle. In some embodiments, the user interface 600 may further display an estimated total cost associated with a certain amount of driving (e.g., based on a destination the driver inputs).

At step 214, the user may select a vehicle and the shared vehicle service system 120 may cause the vehicle to be reserved for the user according to the requested parameters (e.g., as received at step 205).

At step 215, the shared vehicle support platform 110 and/or the shared vehicle service system 120 may continually monitor sensors onboard the vehicle to collect driving data and other information about the use of the shared vehicle. Driving data may comprise data collected from sensors 157 associated with a vehicle and/or the mobile system 150, such as engine data, performance data, navigation data, position data, speed data, acceleration data, braking data, and the like. The driving data may be associated with time stamps indicating a time at which the data was captured. The driving data may be collected by shared vehicle service application 153 executing on the mobile system 150, which may store the driving data and/or trips data in the application database 154 before transmitting it. The mobile system 150 may transmit the driving data periodically and/or in real-time.

In some embodiments, the mobile system 150 may process the driving data upon or after collection and/or storage. For example, the mobile system 150 may use statistical and/or mathematical techniques to determine additional driving data based on the raw sensor data collected from sensors 157. As a specific example, mobile system 150 may analyze and/or process raw braking data and/or raw accelerometer data to detect incidents in which a vehicle experienced fast braking. Mobile system 150 may log an event for each fast braking incident. Each such event may include an indication of the severity of the braking, a speed when braking began, a time of the event, an amount of time that elapsed from the start of braking to the end of braking, and the like. As another example, mobile system 150 may process and/or analyze raw speed and/or raw position data to determine an average speed of the vehicle. As another example, the mobile system 150 may process position data to determine one or more points of interest visited by a driver. In some embodiments, the shared vehicle support platform 110 and/or the shared vehicle service system 120 may perform such processing and/or analysis instead of or in conjunction with the mobile system 150.

At step 216, shared vehicle support platform 110 may update a score for the driver based on the driving data captured by the shared vehicle service application 153. The shared vehicle support platform 110 may use one or more driver score models 117 trained on driving data, initial driver scores, and other such data for other drivers. The one or more driver score models 117 may be trained using machine-learning techniques, statistical techniques, and/or other such techniques for correlating one or more features with historical outcome data. The shared vehicle support platform 110 may train the one or more driver score models 117 prior to executing the method of FIGS. 2A-2E. The historical outcome data may include indications of safety for a number of drivers. Accordingly, the one or more driver score models 117 may calculate an updated score that estimates safety for a driver of the shared vehicle service.

The shared vehicle support platform 110 may train a driver score model 117 using training data that correlates driving data, initial score data, and other such data with indicators of safety. For example, the training data set may correlate driving data (e.g., engine data, performance data, navigation data, position data, speed data, acceleration data, braking data, and the like, as well as data derived from sensor data, such as braking data and/or visited points of interest), initial scores, and/or other input information with indicators of driver safety that may include accident data, tickets, license suspensions and/or cancellations, the cost of insuring a driver, and the like. In some embodiments, the driver score model 117 may be trained to output a continuous value indicating an estimated insurance cost (e.g., in dollars) per mile of driving. Additionally or alternatively, a model may be trained to output a discrete value indicating, for example, an estimated range of an insurance cost (e.g., in dollars) per mile of driving. For example, the model may classify a driver or rider into one of 5 discrete insurance cost/mile categories.

In some embodiments, shared vehicle support platform 110 may train a plurality of driver score models 117 for estimating a safety level in various weather, traffic, and time conditions. For example, shared vehicle support platform 110 may train one driver score model 117 for calculating a safety score during the daytime, one driver score model 117 for calculating a safety score at night, one driver score model 117 for calculating a safety score during snowy weather, one driver score model 117 for calculating a safety score in heavy traffic, and the like. The shared vehicle support platform 110 may train such conditions-specific models by restricting the training data (e.g., such as the driving data) to data correlating with the condition in question and/or by weighting such training data more heavily. For example, shared vehicle support platform 110 may train driver score model 117 for calculating a safety score in light traffic by training using only driving data corresponding to time periods when drivers were driving in light traffic and/or by weighting such driving data more heavily than other training data.

Accordingly, at step 216, shared vehicle support platform 110 may use the driving data (which may include data derived from sensor data, such as visited points of interest) captured by the shared vehicle service application 153 (e.g., at step 214), the initial driver scores determining by the shared vehicle support platform 110 (e.g., at step 204), and other such information as inputs to the one or more driver score models 117 to determine one or more updated scores for a driver. In some embodiments, shared vehicle support platform 110 may extract features from the driving data before using the features as inputs to the one or more driver score models 117 to calculate the updated scores.

Turning to FIG. 2E, at step 217, the shared vehicle service system 120 may receive another request from the same driver for a subsequent reservation (e.g., at a later time). At step 218, the shared vehicle support platform 110 and/or the shared vehicle service system 120 may repeat one or more steps as described above to complete the subsequent reservation. For example, the shared vehicle service system 120 may receive another request and information about the request (e.g., as described for steps 201, 205 above), determine available vehicles and their characteristics (e.g., as described at steps 206, 207), retrieve dynamic conditions data (e.g., as described at step 208), rank the vehicles by safety and/or repair cost (e.g., as described at steps 209, 210), determine a cost/distance for each vehicle (e.g., as described at step 211) select and present one or more best vehicles to the driver (e.g., as described at steps 212, 213), receive a vehicle selection and reserve the vehicle (e.g., as described at step 214), monitor, record, and transmit additional driving data (e.g., as described at step 215), and update the driver score based on the driving data including the additional driving data (e.g., as described at step 216). However, in such subsequent executions of the method, the shared vehicle support platform 110 and/or shared vehicle service system 120 may use the updated driver score (e.g., as determined at step 216) in place of the initial score (e.g., as determined at step 204). Accordingly, the initial driver score may be used for new drivers, or when sufficient driving data has not yet been collected to generate an updated driving score, and the updated driver score may be used for subsequent reservations.

Furthermore, upon subsequent executions of the method that use an updated driving score, the shared vehicle support platform 110 and/or shared vehicle service system 120 may use conditions-specific updated driving scores (e.g., as described at step 216) based on the dynamic conditions data associated with the reservation (e.g., as determined at step 208). The system may thus tailor vehicle recommendations to the strengths of each driver depending on dynamic conditions. Moreover, if multiple dynamic conditions exist, the shared vehicle support platform 110 and/or shared vehicle service system 120 may use a combined driver safety score (e.g., generated by averaging or weighted averaging as discussed for step 209).

Figure 5:
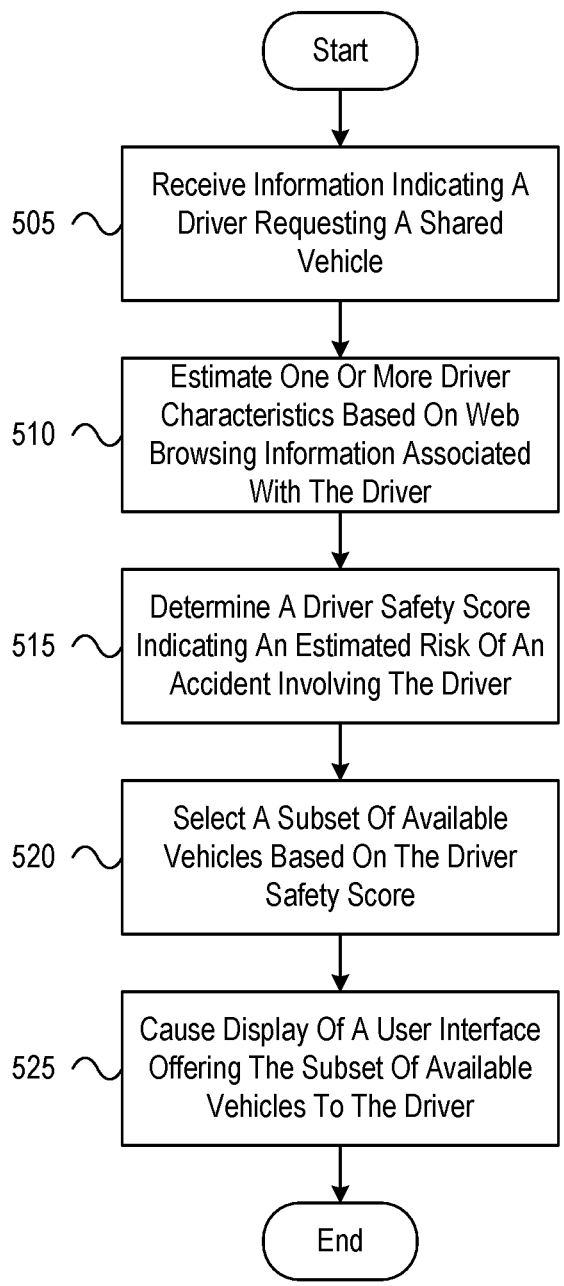
FIG. 5 depicts an illustrative method for matching drivers to shared vehicles in accordance with one or more example embodiments.

FIG. 5 depicts an illustrative method for matching drivers to shared vehicles in accordance with one or more example embodiments. At step 505, a shared vehicle support platform may receive information indicating a driver requesting a shared vehicle. At step 510, the shared vehicle support platform may estimate one or more driver characteristics based on web browsing information associated with the driver. At step 515, the shared vehicle support platform may determine a driver safety score indicating an estimated risk of an accident involving the driver. At step 520, the shared vehicle support platform may select a subset of available vehicles based on the driver safety score. At step 525, the shared vehicle support platform may cause display of a user interface offering the subset of available vehicles to the driver.

The systems and methods described herein beneficially allow a shared vehicle service to estimate a safety of a new driver even without access to detailed driving data for the new driver. By leveraging more available data (such as online browsing data) to estimate characteristics of the driver, a score that estimates safety of the new driver may be calculated. Furthermore, by ranking vehicles by their safety features and by repair cost, the best shared vehicles may be matched to the new driver in order to improve safety, reduce repair cost, or provide selections to the driver that let the driver determine how much risk to assume. Additionally, by updating a driver score using actual driving data obtained while driving a shared vehicle, more accurate driver safety information may obtained and used to better tailor future shared vehicle offerings to the driver.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure

What is claimed is:

1. A method comprising:
    maintaining a database containing a set of one or more shared vehicles, wherein the set of one or more shared vehicles are stored in association with one or more safety features;
    receiving, via a communication interface of a web site portal, information indicating a driver requesting a shared vehicle, wherein the information includes inputted requirements;
    requesting driver data, associated with the driver, from one or more driver information source devices, the driver data includes online behavior data, or driving history;
    receiving first training data, the first training data includes target variables indicating demographic information and preference information correlated with the online behavior data;
    training a driver characteristic model with the first training data, wherein the driver characteristic model is a first machine learning model trained with target variables being driver demographic information or driver preference information, and the target variables are estimated based on correlations of historical demographic information or historical driver preference information to online behavior data;
    generating, with the driver characteristic model and using the online behavior data, the driver demographic information or the driver preference information;
    training an initial score model to correlate driver demographic information or driver preference information with one or more indicators of safety including at least one of accident data, ticket data, license suspension data, or license cancellation data;
    calculating, with the initial score model, an initial safety score based on extracted features from the driver demographic information or the driver preference information, wherein the initial safety score is outputted as a continuous value indicating an estimated risk amount;
    querying the database for a subset of the one or more shared vehicles based on the inputted requirements;
    generating second training data, the second training data correlates historical driving history of the driver and the initial safety score;
    training a driver score model with the second training data, the driver score model is a second machine learning model trained to estimate a driver safety value by correlating historical driving vehicle data and the initial safety score;
    determining, via the driver score model, a driver safety score indicating an estimated risk of an accident involving the driver;
    selecting, from the subset of the one or more shared vehicles, one or more available vehicles based on the driver safety score and one or more safety features of the one or more available vehicles;
    causing, via the communication interface, presentation at a user interface of a list or a map showing the one or more available vehicles to the driver;
    receiving, via the communication interface of the website portal, an indication of a selected vehicle of the one or more available vehicles;
    receiving raw sensor data associated with the driver, wherein the raw sensor data is received continuously and in real-time from one or more sensors associated with the selected vehicle, and wherein the raw sensor data includes at least one of engine data, speed data, or navigation data;

generating, via the driver characteristic model, one or more estimated safe driving characteristics of the driver based on the raw sensor data; and updating, using the driver score model, the driver safety score associated with the driver based on the one or more estimated safe driving characteristics.

2. The method of claim 1, further comprising:

determining information indicating one or more safety features for each of the subset of the one or more shared vehicles, wherein the selecting of the one or more available vehicles is further based on the information indicating the one or more safety features.

3. The method of claim 2, wherein the information indicating the one or more safety features is a safety score.

4. The method of claim 3, further comprising:

ranking the one or more available vehicles based on the safety score of each vehicle of the one or more available vehicles.

5. The method of claim 3, wherein the safety score is further based on one or more dynamic conditions including weather, traffic, and/or time of day.

6. The method of claim 1, further comprising:

determining information indicating a repair cost for each of the subset of the one or more shared vehicles, wherein the selecting of the one or more available vehicles is further based on the information indicating the repair cost.

7. The method of claim 6, wherein the information indicating the repair cost is a repair cost score.

8. The method of claim 6, further comprising:

ranking the one or more available vehicles based on the repair cost of each vehicle of the one or more available vehicles.

9. The method of claim 1, further comprising:

determining a cost per distance associated with each of the one or more available vehicles, wherein the causing presentation at the user interface includes causing display of the cost per distance for each vehicle of the one or more available vehicles.

10. The method of claim 1, wherein, the driver data includes online behavior data, and the one or more estimated safe driving characteristics are one or more of an age, gender, or zip code of the driver.

11. A shared vehicle support platform comprising one or more processors and memory storing instructions that, when executed by the one or more processors, cause the shared vehicle support platform to:

maintain a database containing a set of one or more shared vehicles, wherein the set of one or more shared vehicles are stored in association with one or more safety features;

receive, via a communication interface of a website portal, information indicating a driver requesting a shared vehicle, wherein the information includes inputted requirements;

request driver data, associated with the driver, from one or more driver information source devices, the driver data includes online behavior data;

receive first training data, the first training data includes target variables indicating demographic information and preference information correlated with the online behavior data;

train a driver characteristic model with the first training data, wherein the driver characteristic model is a first machine learning model trained with target variables being driver demographic information or driver preference information, and the target variables are estimated based on correlations of historical demographic information or historical driver preference information to online behavior data;

generate, with the driver characteristic model and using the online behavior data, the driver demographic information or the driver preference information;

train an initial score model to correlate driver demographic information or driver preference information with one or more indicators of safety including at least one of accident data, ticket data, license suspension data, or license cancellation data;

calculate, with the initial score model, an initial safety score based on extracted features from the driver demographic information or the driver preference information, wherein the initial safety score is outputted as a continuous value indicating an estimated risk amount;

query the database for a subset of the one or more shared vehicles based on the inputted requirements;

generate second training data, the second training data correlates historical driving history of the driver and the initial safety score;

train a driver score model with the second training data, the driver score model is a second machine learning model trained to estimate a driver safety value by correlating historical driving vehicle data and the initial safety score;

determine, via the driver score model, a driver safety score indicating an estimated risk of an accident involving the driver;

select, from the subset of the one or more shared vehicles, one or more available vehicles based on the driver safety score and one or more safety features of the one or more available vehicles;

output, via the communication interface, a user interface having a list or a map showing the one or more available vehicles to the driver;

receive, via the communication interface of the website portal, an indication of a selected vehicle of the one or more available vehicles;

receive raw sensor data associated with the driver, wherein the raw sensor data is received continuously and in real-time from one or more sensors associated with the selected vehicle, and wherein the raw sensor data includes at least one of engine data, speed data, or navigation data;

generate, via the driver characteristic model, one or more estimated safe driving characteristics of the driver based on the raw sensor data; and update, using the driver score model, the driver safety score associated with the driver based on the one or more estimated safe driving characteristics.

12. The shared vehicle support platform of claim 11, wherein, the memory further stores instructions that, when executed by the one or more processors, cause the shared vehicle support platform to determine information indicating one or more safety features for each of the subset of the one or more shared vehicles, and selecting the one or more available vehicles is further based on the information indicating the one or more safety features.

13. The shared vehicle support platform of claim 12, wherein the information indicating the one or more safety features is a safety score.

14. The shared vehicle support platform of claim 11, wherein,
the memory further stores instructions that, when executed by the one or more processors, cause the shared vehicle support platform to determine information indicating a repair cost for each of the subset of the one or more shared vehicles, and
selecting the one or more available vehicles is further based on the information indicating the repair cost.

15. The shared vehicle support platform of claim 14, wherein the information indicating the repair cost is a repair cost score.

16. The shared vehicle support platform of claim 15, wherein the memory further stores instructions that, when executed by the one or more processors, cause the shared vehicle support platform to rank the one or more available vehicles based on the repair cost score of each vehicle of the one or more available vehicles.

17. The shared vehicle support platform of claim 11, wherein, the memory further stores instructions that, when executed by the one or more processors, cause the shared vehicle support platform to determine a cost per distance associated with each of the one or more available vehicles, and cause display of the cost per distance for each vehicle of the one or more available vehicles to the driver.

18. One or more non-transitory computer readable media storing computer-executable instructions that, when executed by one or more processors of a shared vehicle service system, cause the shared vehicle service system to:
maintain a database containing a set of one or more shared vehicles, wherein the set of one or more shared vehicles are stored in association with one or more safety features;
receive, via a communication interface of a website portal, information indicating a driver requesting a shared vehicle, wherein the information includes inputted requirements;
request driver data, associated with the driver, from one or more driver information source devices, the driver data includes online behavior data;
receive first training data, the first training data includes target variables indicating demographic information and preference information correlated with the online behavior data;
train a driver characteristic model with the first training data, the driver characteristic model is a first machine learning model trained with target variables being driver demographic information or driver preference information, and the target variables are estimated based on correlations of historical demographic information or historical driver preference information to online behavior data;
generate, with the driver characteristic model and using the online behavior data, the driver demographic information or the driver preference information;
train an initial score model to correlate driver demographic information or driver preference information with one or more indicators of safety including at least one of accident data, ticket data, license suspension data, or license cancellation data;
calculate, with the initial score model, an initial safety score based on extracted features from the driver demographic information or the driver preference information, wherein the initial safety score is outputted as a continuous value indicating an estimated risk amount;
query the database for a subset of the one or more shared vehicles based on the inputted requirements;
generate second training data, the second training data correlates historical driving history of the driver and the initial safety score;
train a driver score model with the second training data, the driver score model is a second machine learning model trained to estimate a driver safety value by correlating historical driving vehicle data and the initial safety score;
determine, via the driver score model, a driver safety score indicating an estimated risk associated with the driver;
select, from the subset of the one or more shared vehicles, one or more available vehicles based on the driver safety score and one or more safety features of the one or more available vehicles;
cause, via the communication interface, presentation at a user interface of a list or a map showing the one or more available vehicles to the driver;
receive, via the communication interface of the website portal, an indication of a selected vehicle of the one or more available vehicles;
receive raw sensor data associated with the driver, wherein the raw sensor data is received continuously and in real-time from one or more sensors associated with the selected vehicle, and wherein the raw sensor data includes at least one of engine data, speed data, or navigation data;
generate, via the driver characteristic model, one or more estimated safe driving characteristics of the driver based on the raw sensor data; and
update, using the driver score model, the driver safety score associated with the driver based on the one or more estimated safe driving characteristics.

* * * * *